United States Patent [19]

De Long

[11] 4,169,902
[45] Oct. 2, 1979

[54] METHOD OF REPELLING ANIMALS AND BIRDS

[75] Inventor: Charles F. De Long, Washington, D.C.

[73] Assignee: United States Trading International, Inc., Washington, D.C.

[21] Appl. No.: 817,440

[22] Filed: Jul. 20, 1977

Related U.S. Application Data

[63] Continuation-in-part of Ser. No. 614,925, Sep. 19, 1975, Pat. No. 4,094,845.

[51] Int. Cl.² ............... B05D 1/02; A01N 9/02; A01N 9/24; A01N 9/70
[52] U.S. Cl. ............................ 427/4; 427/136; 47/58; 47/DIG. 11; 71/27; 71/65; 424/81
[58] Field of Search ............ 427/4, 136; 71/3, 27, 71/65; 47/DIG. 7, DIG. 11, 58; 260/29.6 NR, 29.6 TA, 29.6 HN, 29.6 E, 29.6 AT, 29.6 RW, 29.4 UA, 29.3; 424/81

[56] References Cited

U.S. PATENT DOCUMENTS

| 1,931,325 | 11/1933 | Pillsbury | 47/58 |
|---|---|---|---|
| 3,089,280 | 5/1963 | Klaas | 47/58 |
| 3,676,102 | 7/1972 | Clark et al. | 427/4 |
| 3,682,814 | 8/1972 | Gilchrist | 204/181 |

*Primary Examiner*—James R. Hoffman
*Attorney, Agent, or Firm*—Strauch, Nolan, Neale, Nies & Kurz

[57] ABSTRACT

A method for repelling animals and birds consists of applying to an area being protected a composition consisting essentially of an aqueous solution or dispersion of a carboxylated hydrophilic acrylic copolymer, a crosslinking agent for the carboxylated hydrophilic copolymer, a stabilizingly effective amount of an ultraviolet-absorbing agent and an animal or bird repelling compound.

23 Claims, No Drawings

METHOD OF REPELLING ANIMALS AND BIRDS

REFERENCE TO RELATED APPLICATION

This is a continuation-in-part of DeLong, "METHOD OF REDUCING LOSS OF WATER BY TRANSPIRATION AND COMPOSTION THEREFOR," Ser. No. 614,925, filed Sept. 19, 1975, now U.S. Pat. No. 4,094,845.

BACKGROUND OF THE INVENTION

This invention relates to a method for repelling animals or birds from large areas of land or wooded areas and to a composition for this purpose.

Among the natural hazards to aviation are deer and birds. Birds are particularly hazardous when an airport is located close to a garbage dump. Several airplane crashes have been attributed to flocks of birds, which circle in the landing pattern or near the ends of the airport runway. Other airports are located in wooded areas and have large grassy areas adjacent to the runways, which areas are extremely attractive to deer and other ruminating animals which graze in open or wooded areas.

Birdstrike and deerstrike can cause considerable economic damage as, for example, damages amounting to $250,000 to a Beech 99 mail plane which struck a deer on its landing rollout at a Pennsylvania airfield. In the winter season of 1976–1977, one of five deerstrike accidents at Dulles International Airport included an encounter with a B-707 during the takeoff run. It will be appreciated that for every case in which physical contact and property damage by deerstrike or birdstrike occurred, there are several "near misses", which are necessarily harrowing occurrences to the pilots of the aircraft involved and to the operators of the airport facilities. See, E. A. Jerome, "The Deerstrike Hazard," Airport Safety Bulletin, March, April, 1977, Flight Safety Foundation, Inc., Arlington, Va., 22209, for a description of unsuccessful procedures for preventing deerstrike.

Zinc dimethyldithiocarbamate, tetramethylthiuram disulfide (Littler, U.S. Pat. No. 3,060,084) and dithiocarbonic acid O-ethyl-S-[2-(p-chlorophenylmercapto)-chloropropyl ester] (Schrader et al., U.S. Pat. No. 3,686,257), the disclosures of which are herein incorporated by reference, are among known animal or bird repellant material. The Littler patent indicates that polycarboxylated hydrocarbon polymeric suspending agents are used in combination with a dispersing agent.

Stone (U.S. Pat. No. 3,663,253) employs aluminum salts in animal deterrent composition. Kenaga (U.S. Pat. No. 3,389,048) teaches the use of tricyclohexyltin compounds as a repellant for feeding mammals. Hawthorne et al., (U.S. Pat. No. 2,971,962) indicated that 2-hydroxybiphenyl-2'-carboxylic acid lactone is useful as a rodent repellent. Wicker, Jr. et al. (U.S. Pat. No. 2,933,429) employs ethylene dinitriles and esters of ethylene dicarboxylic acid esters for the same purpose.

Needham et al. (U.S. Pat. No. 3,694,543) and Woodruff (U.S. Pat. No. 3,740,201) disclose the formulation of various animal repellant compounds with olefin polymers and copolymers.

It will be appreciated that materials applied to grazing areas or wooded areas from which it is intended to repel birds, deer or other objectionable animals must not interfere with the life processes of the grassy areas, i.e., the material must permit transpiration and photosynthesis. It is also apparent that any material applied to grassy areas, or to the runways of an airport or to any other locus being protected should be stable and adhere relatively persistently to the area being protected, so that frequent applications of the repellant material are not required.

Materials which have been applied to plants or grass, for various reasons, including prevention of loss of water by transpiration, include wax emulsions, as practiced by Cushman (U.S. Pat. No. 3,847,641), liquid polyterpenes, Clark et al (U.S. Pat. No. 3,676,102), polymers made from isocyanates as taught by Cooke (U.S. Pat. No. 3,539,373), long chain esters of lower organic acids as suggested by Gabor (U.S. Pat. No. 3,199,944) and soluble carboxylated polymers, for example, derived from Cellosolve ® acrylate and methacrylic acid as taught by Ferguson (U.S. Pat. No. 3,157,964). Klaas (U.S. Pat. No. 3,089,280) discloses the treatment of plants with an acrylic-based light-affecting composition containing optical brighteners. However, each of these compositions has one or more deficiencies. For example, the polymers used by Gabor are highly soluble, so that frequent applications are required to maintain effective protection against excessive transpiration. Although the main purpose of the Klaas coating is to produce a hard and brilliant finish on plants, the desired effect is achieved only by at least two coatings applied at intervals of about two to four weeks.

Polymer coatings have been applied to plants for other purposes, such as the coloring of grass. However, according to the teachings of Converse (U.S. Pat. No. 2,870,037) and Gardner (U.S. Pat. No. 2,786,821), the grasses so treated seem to have been protected from deterioration or crumbling through mechanical action of the polymer.

It is therefore apparent that although products are available which are essentially soluble and which are easily applied to grass or plants, such products are washed from the sprayed plants after an unpredictable time interval based primarily on the frequency of rainfall. Known compositions must therefore be reapplied frequently to maintain their efficacy. Furthermore, most of the known products have varying stability to ultraviolet radiation in sunlight, so that the products deteriorate and then wash away. There is at present no product applied to the leaves and stems of plants which has an active applied life exceeding much more than about three weeks.

Therefore, there is a continuing need for animal and bird repellant compositions which are easily applied to grassy areas, wooded areas or runways of airports, to dumps adjacent to airports or to grassy and wooded areas adjacent to highways, which are relatively persistent once applied and which have no deleterious effects on the surfaces to which they are applied.

SUMMARY OF THE INVENTION

In one aspect, this invention relates to a composition for repelling animals or birds from a grassy, wooded or paved area, consisting essentially of an aqueous solution or dispersion of a carboxylated hydrophilic acrylic copolymer, a cross-linking agent for the carboxyl of the acrylic copolymer, a stabilizingly effective amount of an ultraviolet-absorbing agent and an animal- or bird-repelling amount of an animal or bird repellant.

This invention relates, in a method-of-use aspect, to a method for repelling animals or birds from a grassy, wooded or paved area, or other locus to be protected comprising applying to the locus to be protected an animal- or bird-repelling amount of the foregoing composition.

DETAILED DESCRIPTION

As used in the specification and claims, "carboxylated hydrophilic acrylic copolymer" means any copolymer which contains at least some carboxylic acid groups introduced by polymerization of an alpha, beta-unsaturated acid. Examples of alpha,beta-unsaturated acids for the purposes of this invention include acrylic acid, methacrylic acid, itaconic acid, crotonic acid, maleic acid, citraconic acid, ethacrylic acid and the like. Acrylic acid is preferred.

Monomers usable in the preparation of the carboxylated hydrophilic polymers of this invention include the lower alkyl acrylate and methacrylate esters and monomers polymerizable therewith, including, but not limited to, styrene, vinyl acetate, ethyl vinyl ether, substituted styrenes, and the like. However, hydrophilic carboxylated copolymers prepared from lower alkyl acrylates and methacrylates and carboxylic monomer exclusively are preferred. Typical of the esters preferred for making the carboxylated hydrophilic copolymers are the $C_1$-$C_4$ alkyl acrylates and methacrylates, such as methyl acrylate, ethyl acrylate, n-propyl acrylate, isopropyl acrylate, the butyl acrylates and the corresponding methacrylates. Especially preferred monomers are methyl methacrylate, ethyl methacrylate, butyl acrylate, ethyl acrylate, methyl acrylate and mixtures thereof, particularly with from about 5% to about 20% by weight of acrylic acid monomer.

Copolymers used in the compositions of this invention can be made as disclosed, for example, by Uelzmann (U.S. Pat. No. 2,904,526), Conrady et al. (3,590,118) or Stockman (U.S. Pat. No. 3,699,067), herein incorporated by reference.

A composition particularly preferred for the purposes of this invention consists of a copolymer based on about 56% by weight of methyl methacrylate, about 30% by weight of ethyl methacrylate and about 14% by weight of acrylic acid. An equally preferred composition is based on about 44% by weight of butyl acrylate, 40% by weight of methyl acrylate and about 16% by weight of acrylic acid. Also preferred is a polymer containing about 90% by weight of ethyl acrylate and about 10% by weight of acrylic acid units.

Typical of commercially available hydrophilic copolymers which can be used according to this invention is Carboset® 514H, a dispersion in ammonia water (40% solids) or solution in isopropanol (70% solids) available from the B. F. Goodrich Chemical Co.

For ease of application, the copolymer or terpolymer is preferably solubilized in water by adjustment of the pH to 8 or higher. Exemplary materials for adjustment of the pH include sodium hydroxide, ammonium hydroxide, potassium hydroxide or organic amines, including but not limited to dimethylamine, diisopropylamine, morpholine, triethylamine, ethylenediamine, 2-methylpiperazine, monoamylamine, dibutylamine, 2-amino-2-methyl-1,3-propanediol, and the like. Of the foregoing, ammonium hydroxide and diisopropylamine are preferred. It is thought that the amines vaporize during the curing process.

The molecular weight of the copolymer or terpolymer prior to cross-linking can vary between about 5000 and three million. Preferably, the molecular weight is between about 10,000 and 100,000. Although it is difficult to determine the molecular weight of the product after cross-linking, it is thought generally to be up to one million or higher.

Cross-linking agents suitable for the purposes of this invention include difunctional and polyfunctional materials which react with the carboxyl groups of the hydrophilic acrylic copolymers used herein. Exemplary of cross-linking agents which convert the hydrophilic copolymers of this invention to essentially permanent animal and bird repellant compositions are formaldehyde-condensation resins, epoxy compounds and multivalent metal ions. Formaldehyde resins include those based on melamine, such as the methylol melamines and the lower molecular weight melamine-formaldehyde resins as well as methylolated phenols and lower molecular weight phenol-formaldehyde resins. Epoxy compounds include diglycidyl and triglycidyl ethers and low molecular weight epoxy resins or diepoxide ethers of epoxide equivalents between 174 and 2000. Typical of multivalent metal ions which can be used are zinc, chromium, aluminum, iron, calcium and titanium, in the form of salts, oxides or hydroxides.

Among commercially available formaldehyde resins which can be used as cross-linking agents are melamine-formaldehyde resins such as Resimene® RF 5306 (Monsanto Chemical Co.) and Cymel® 300 (American Cyanamid Co.). Melamine-formaldehyde resins and methylolated melamine derivatives are among the cross-linking agents preferred for the practice of this invention.

Commercially available epoxy compounds for the purposes of this invention include Epon® 828 (Shell Chemical Co.), the diglycidyl ether derived from epichlorohydrin and bisphenol A; Epon® 812 (Shell Chemical Co.), the triglycidyl ether of glycerol; Eponite® 100 (Shell Chemical Co.), a water-dispersible epoxy resin; and DER 332 (Dow Chemical Co.), as disclosed by Smith et al. (U.S. Pat. No. 3,240,376), incorporated herein by reference. Preferred epoxy compounds are the diglycidyl and triglycidyl ethers, especially bisphenol A diglycidyl ether and glycerine triglycidyl ether.

Although a variety of metallic ions can be used to provide cross-linking, the preferred system is one in which the cross-linking agent is zinc ions. A convenient way of preparing materials using zinc ions as cross-linking agent is to use a solution of zinc ammonium carbonate complex, which is added to the solution or dispersion of polymer.

The amount of cross-linking agent can be varied from about 1% to about 20% by weight (as solids) of hydrophilic acrylic copolymer. Preferably the amount of cross-linking agent is from about 1% to about 5% by weight of the hydrophilic acrylic resin.

Although the compositions prepared according to this invention ultimately become cross-linked and adhere relatively permanently to the grassy, wooded or paved areas being protected against animals or birds, it will be understood that the compositions used according to this invention have a reasonable life. Thus, a system consisting of a carboxylated acrylic terpolymer and a glycidyl ether has a life of about six days at room temperature, so that compositions for the practice of this invention can be prepared several days before use. Compositions using melamine-formaldehyde resins as the cross-linking agent have an apparently indefinite shelf life. Preferably, however, the hydrophilic acrylic resin and cross-linking agent, ultraviolet absorber and animal- or bird-repellant are mixed just prior to use so that the products are of low viscosity for ease of application.

"Ultraviolet-absorbing agent," as used in the specification and claims, means a material which is compatible with the carboxylated hydrophilic acrylic copolymer and cross-linking agent and which absorbs incident radiation in the range between about 2700 Å and about 4000 Å. Among materials known to function as ultraviolet-absorbing agents are coumarin ethers; esters of para-aminobenzoic acid, such as the glyceryl ester; esters of substituted para-aminobenzoic acids and para-methoxycinnamic acid, e.g., the 2-ethoxyethyl ester; benzophenone derivatives, e.g., 2-hydroxy-4-methoxybenzophenone; triazolylketones, such as 2-phenylbenzoxazole derivatives; bisoxalic acid diamides; benzoylbenzofuran derivatives; formazan derivatives and metal chelates of bicyclononanedione esters; bis-alpha-cyano-beta,beta-diphenylacrylic acid derivatives; 2-aryl-4,5-arylo-1,2,3-triazoles; beta-benzoyloxy-2'-hydroxychalcones; and the like.

The preferred ultraviolet-absorbing materials used in accordance with this invention are those which absorb from about 2700 Å to about 3300 Å. Among compounds which absorb selectively in this more limited region are benzoylbenzofurans (Baron et al., U.S. Pat. No. 3,448,190), which absorb primarily from about 2900 Å to about 3200 Å and various cinnamate esters, which absorb from about 2700 Å to about 3300 Å. Particularly preferred as an ultraviolet-absorber is 2-ethoxyethyl p-methoxycinnamate, available under the trade name of Giv-Tan ® from Sindar Division of Givaudan Corp., Clifton, N.J.

The amount of ultraviolet-absorbing agent is that which is effective to protect the resin against deterioration caused by ultraviolet irradiation of incident sunlight for periods of 6–12 months. The requisite amount can be as little as about 0.0001% by weight of the solution or dispersion of this invention. Although it is possible to use amounts as high as about 1% by weight of ultraviolet-absorbing agent, the preferred range of ultraviolet-absorbing agent is from about 0.0005% to about 0.30% by weight of the solution or dispersion.

The solutions or dispersions of this invention can contain as low as 3% by weight of solids, in the form of carboxylated hydrophilic acrylic copolymer and cross-linking agent, up to a maximum of about 30% by weight. However, the preferred level of solids is from about 5% to about 15% by weight of the dispersion.

Animals and birds which can be repelled by the compositions and methods of the invention include, but are not limited to, deer, rodents, rabbits, horses, goats, dogs, cats, geese and seagulls, i.e., destructive leporine animals, rodents, ruminants and birds.

Leporine animals include the Leporidae, such as the rabbit (*Oryctolagus cuniculus*), squirrel-like animals, e.g., the European souslik (*Citellus citellus*) and the ground squirrel (*Citellus lateralis*). Gophers include, e.g., the mountain pocket gopher (*Thomomys talpoides*). Dormouse-like animals include, e.g., the fat dormouse (*Glis glis*), and mice comprise essentially long-tailed mice (Murinae); rats (Rattus spec.), such as the black rat (*Rattus rattus*) and the Norway rat (*Rattus norvegicus*); house mice (Mus spec.), such *Mus musculus*. Hamster-like animals (Cricetinae) are, e.g., the European hamster (*Cricetus cricetus*) and the short-tailed mice (Microtinae), e.g., the common vole (*Microtus arvalis*), the field vole (*Microtus agrestis*) and the water vole (*Arvicola terrestris*).

The most important of the destructive ruminants (Ruminantia) are deer (Cervidae) and horned animals (Bovidae).

Deer contemplated herein include, e.g., the roe deer (*Capreolus capreolus*), the Virginia deer (*Odocoileus* spec.), the fallow deer (*Dama dama*), the wapiti (*Cervus canadensis*) and the red deer (*Cervus elaphus*), and the like. Horned animals contemplated herein include the chamois-like animals (Rupicaprinae), sheep (Ovis spec.) and goats (Capra spec.).

"Animal repellant," as used in the specification and claims include compounds cited above, as well as bone tar oil. Contemplated equivalents are compounds recognized in the art as having animal-repelling or bird-repelling activity, e.g., typical bird repellants disclosed by Goodhue et al. in U.S. Pat. Nos. 3,082,149, 3,103,465 and 3,113,072. It will be understood that repellant materials which are active owing to their effect on either taste or smell can be used.

Of the foregoing, tetramethylthiuram disulfide (TMTD) is preferred, particularly as a rabbit and deer repellant, and bone tar oil as a deer repellant. Aromatic hydrocarbon extracts, as of Goodhue et al. U.S. Pat. No. 3,082,149, are preferred bird repellants. TMTD may be purchased as ARASAN-42-S (E. I. du Pont de Nemours & Co.), which is thought to be a dispersion in accordance with Littler, Supra. Another source of TMTD is J. H. Ehrlich Chemical Co., Inc., Reading, Pa., which supplies TMTD (20% real) as "Magic Circle Rabbit Repellant." "Magic Circle Deer Repellant", from the same source, corresponds to bone tar oil (93.75% real).

Herbicides, fungicides, insecticides, nematocides, fertilizers, plant-growth regulators or colorants are optional additives to the compositions of this invention. Thus, in addition to protecting wooded or grassy areas against damage by undesired intruders, the compositions of this invention can be used as carriers for these agents, which are thought to leach slowly from the cmpositions and which are therefore administered to the grass or forests over a prolonged period of time.

Illustrative of herbicides, fungicides, insecticides and nematocides which can be added to the compositions of this invention are copper carbonate, copper oleate, methyl-1-butylcarbamoyl)-2-benzimidazole carbamate, 2,6-dichloro-4-nitroaniline, coordination product of zinc and manganese ethylene bisdithiocarbamate (Dithane M-45), 1-chloro-2-nitropropane, 8-hydroxyquinoline sulfate, triphenyltin hydroxide, O,O,O',O'-tetramethyl-O,O'-dithiodi-p-phenylene phosphorothioate, O-[2-chloro-1-(2,5-dichlorophenyl)-vinyl]O,O-diethyl phosphorothioate, aldrin, allethrin, 2-isopropoxyphenyl N-methylcarbamate, benzene hexachloride (BHC), chlorodane, ethyl 4,4'-dichlorobenzilate, 1,1-dichloro-2,2-bis(p-chlorophenyl)-ethane, 1,1,1-trichloro-2,2-bis(p-chlorophenyl)ethane (DDT), O,O-dimethyl-O-(2,2-dichlorovinyl)phosphate (DDVP), Dieldrin, tetramethyl phosphorodiamidic fluoride, 2-sec-butyl-4,6-dinitrophenyl isopropyl carbonate, Endrin, O,O,O',O'-tetraethyl-S,S'-methylene biphosphorodithioate, heptachlor, dibasic lead arsenate, O,O'-diethyl-O-p-nitrophenyl phosphorothioate (Parathion), piperonyl butoxide, p-chlorophenyl phenyl sulfone, 2-(ethylamino)-4-(isopropylamino)-(methylthio)-s-triazine, N,N'-diallyl-2-chloroacetamide, 2,4-dichlorophenoxyacetic acids and its salts (2,4-D derivatives), diphenylacetonitrile, 3-phenyl-1,1-dimethylurea, 3-phenyl-1,1-dimethylurea trichloroacetate 3-(p-chlorophenyl)-1,1-dimethylurea 1-napthyl N-methylcarbamate (Sevin), pentachlorophenol, trichloronitromethane (chloropicrin), 1,2-dibromo-3-chloropropane and the like.

Exemplary colorants are set forth in Gardner and Converse, Supra.

Preferably, the additive will be a fertilizer, e.g., N-P-K liquid fertilizer, or a plant growth regulator, e.g., a maleic hydrazide compound, especially maleic hydrazide at a level of 1–3% by weight. (See Woodham, British Pat. No. 1,226,861).

The amount of herbicide, fungicide, insecticide, nematocide, fertilizer, plant growth regulator or colorant added to the compositions of this invention is generally from about 0.005% to about 5% by weight of the total of hydrophilic acrylic resin and cross-linking agent, preferably from about 0.05% to about 5% by weight.

The method of this invention contemplates application to the grassy, wooded or paved areas by any of a variety of conventional techniques, including but not limited to mist spraying and pressure spraying. For application to airport buildings or wooded areas, the dispersion is conveniently applied by spraying from a helicopter or other small aircraft.

The dispersion is conveniently made at relatively high solids concentrations, i.e., 30% or higher total solids, calculated as the total of hydrophilic acrylic copolymer and cross-linking agent therefor, and diluted at the time of use with water, usually with 1-11 volumes thereof. A particularly preferred concentrate contains 40% by volume of hydrophilic acrylic copolymer and 1-5% by volume of cross-linking agent and is preferably diluted with 6-10 volumes of water, most preferably 11 volumes of water.

The amount of animal or bird repellant material added to the copolymer dispersion, whether added before, during or after dilution with water, is generally of the order of 0.5-5 parts by weight of the total weight of dispersion as applied. A preferred amount of animal or bird repellant is 0.5-3 parts by weight of the dispersion applied.

The amount of thus prepared and diluted dispersion applied can vary from about one to about 15 gallons per acre, preferably 2-10 gallons per acre. The amount applied is preferably varied according to the type of area being sprayed, with higher levels of material being applied to wooded areas, intermediate amounts to the runways and grassy areas and lower amounts to the buildings. For dumps located close to airports, the preferred level of application is 10 gallons per acre. Particularly preferred levels are 2 gallons per acre around airport buildings, 3 gallons per acre on the airport runways and grassy areas five gallons per acre in outlying wooded areas and 10 gallons per acre on dumps.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, the temperatures are set forth uncorrected in degrees Celsius; unless otherwise indicated, all parts and percentages are by weight.

EXAMPLE 1

An animal repellant composition was made by charging the following into a 55-gallon reactor equipped with a propeller agitator and stirring vigorously until a homogeneous dispersion was obtained:

| | |
|---|---|
| water | 120 liters |
| terpolymer (56% by weight of methyl methacrylate, 30% ethyl methacrylate, 14% of acrylicacid; molecular weight 30,000; 30% solids in water; pH 7.5) | 30 liters |
| glycerol triglycidyl ether | 3 liters |
| surfactant (Darvan) | 1.5 liters |
| 2-ethoxyethyl p-methoxycinnamate | 80 milliliters |

The dispersion obtained was diluted with 1225 liters of water (8 volumes) and 27.5 liters (2% by volume) of TMTD (Arasan-42-S, 42% real) was added thereto. The product was applied in the fall by aerial spraying from a helicopter to Mid-State Airport, Philipsburg, Pa. at a level of 2 gallons per acre around the buildings, 3 gallons per acre on the airport proper and 5 gallons per acre on wooded areas. The airport was protected from deer invasion for about 6 months.

EXAMPLE 2

The diglycidyl ether obtained by reaction between epichlorohydrin and bisphenol A (Epon® 828, Shell Chemical Co.) was substituted for Epon® 812 used in Example 1. The resulting dispersion is sprayed with the same results as in Example 1.

EXAMPLE 3

Sevin® (1-naphthyl N-methylcarbamate, two pounds) is added to 100 gallons of composition prepared according to Example 1. The combination was sprayed on a stand of maple trees near an airport. Damage by gypsy moths and by deer is markedly decreased, compared to unsprayed trees, for a period of one year following the spraying.

EXAMPLE 4

Weed killer (2,4-D, 2,4-dichlorophenoxyacetic acid, two pounds) is added to 100 gallons of composition prepared according to Example 1. The solution is sprayed on the grassy portion of an airport. No deer invasion is observed and the weeds are destroyed.

EXAMPLE 5

Liquid fertilizer (12-6-6, N-P-K; one gallon) is added to 100 gallons of solution prepared according to Example 1. The mixture is sprayed on trees, shrubs and grass in the vicinity of an airport. No deer invasion occurred and growth is markedly improved.

EXAMPLE 6

An animal repellant composition is prepared by mixing the following materials in a ten-gallon stainless steel can equipped with mechanical stirring:

| | |
|---|---|
| water | 6 gallons |
| terpolymer (56% by weight of methyl methacrylate, 30% of ethyl methacrylate, and 14% of acrylic acid; molecular weight 30,000: 30% solids in water) | 3 gallons |
| cross-linking agent (Epon® 812) | 0.3 gallon |

-continued

| | |
|---|---|
| 2-ethoxyethyl p-methoxycinnamate | 4 ounces |

The resultant solution (pH 7.5) is diluted with 10 volumes of water and made up to contain 2.5% by volume of bone tar oil. Application and results are similar to those of Example 1.

EXAMPLE 7

An aqueous dispersion is prepared from:

| | |
|---|---|
| copolymer (90% by weight of ethyl acrylate and 10% of acrylic acid; 30% solids by weight in aqueous ammonia solution; pH 7.5) | 30 liters |
| ammonia solution (3% by weight of ammonia) | 45 liters |
| polyethylenimine (molecular weight 40,000-60,000; 40% solution in water) | |
| glycerine triglycidyl ether | 3 liters |
| 2-ethoxyethyl p-methoxycinnamate | 3 liters |

The ingredients of the dispersion are combined. The concentrate so obtained is diluted with seven parts by volume of water and bone tar oil (2% by weight of the total) is added. The product is sprayed at a level of 4 gallons per acre to the wooded and grassy areas near an airport. Results are as in Examples 1-6.

EXAMPLE 8

An aqueous dispersion is prepared from:

| | parts by weight |
|---|---|
| terpolymer (44% by weight of butyl acrylate, 40% of methyl acrylate and 16% of acrylic acid; 30% solids in ammonia water; pH 7.5; molecular weight 16,000) | 40 |
| zinc ammonium carbonate complex | 2 |
| 2-ethoxyethyl p-methoxycinnamate | 24 |
| ammonium hydroxide solution (3% by weight of ammonia) | 90 |
| polyethylenimine (molecular weight 30,000-40,000; 40% solution in water) | 200 |
| deionized water | 300 |

The zinc ammonium carbonate complex is prepared by dissolving 7.2 parts by weight of ZnO and 21.7 parts of ammonium carbonate in 71.4 parts by weight of water and then adding 8.7 parts by weight of concentrated ammonium hydroxide.

The zinc cross-linked polymer thus obtained is applied according to the preceding examples, following addition thereto of 1.5% by weight of aromatic distillate. The product repels birds for several months.

EXAMPLE 9

A mixture of 375 parts by weight of Carboset® 514H (40% solids in ammonia water), 542 parts of demineralized water, 83 parts of Resimene® RF 5306 (melamine-formaldehyde resin; Monsanto Chemical Co.) and 25 parts of 2-ethoxyethyl p-methoxycinnamate is prepared by combining the Carboset® 514H and water and then adding the Resimene® RF 5306 slowly along with the Giv-Tan® and stirring until the mixture is uniform. The product is diluted with 10 parts by weight of water and TMTD (1.5% by weight) is added thereto. An airport sprayed at an average level of 3 gallons per acre is rendered free of bird strike and deer strike for several months.

EXAMPLE 10

To 100 gallons of dispersion prepared as in Example 1 is added 2 gallons of maleic hydrazide (MH[30], 30% real). The product is applied to grassy areas as in Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for repelling animals or birds from a grassy, wooded or paved area consisting of applying to a locus to be protected an animal- or bird-repelling amount of a composition consisting essentially of an aqueous solution or dispersion of a carboxylated hydrophilic acrylic copolymer, a cross-linking agent for the carboxyl of the carboxylated hydrophilic acrylic copolymer, and a stabilizingly effective amount of an ultraviolet-absorbing agent and an animal- or bird-repelling amount of an animal or bird repellant.

2. The method of claim 1, wherein the composition contains from about 0.0005% to about 0.30% by weight of the aqueous solution or dispersion of the ultraviolet-absorbing agent.

3. The method of claim 1, wherein the ultraviolet-absorbing agent absorbs from about 2700 Å to about 3300 Å.

4. The method of claim 1, wherein the carboxylated hydrophilic acrylic copolymer and the cross-linking agent together comprise from about 3% to about 30% of the aqueous solution or dispersion.

5. The method of claim 1, wherein the aqueous solution or dispersion is applied at a rate of 1-10 gallons per acre.

6. The method of claim 1, wherein the carboxylated acrylic copolymer contains monomer units from at least one $C_1$-$C_4$ alkyl acrylate or methacrylate and from about 5% to about 20% by weight of at least one carboxylic monomer.

7. The method of claim 1, wherein the carboxylated hydrophilic acrylic copolymer contains monomer units from at least one $C_1$-$C_4$ alkyl acrylate or methacrylate and from about 5% to about 20% by weight of acrylic acid monomer.

8. The method of claim 1, wherein the cross-linking agent is a diglycidyl or triglycidyl ether or a low molecular weight epoxy resin.

9. The method of claim 1, wherein the cross-linking agent is a methylolated melamine or low molecular weight melamine-formaldehyde resin.

10. The method of claim 1, wherein the cross-linking agent is a multivalent inorganic salt, oxide or hydroxide.

11. The method of claim 1, wherein the cross-linking agent is zinc oxide, zinc carbonate or an ammoniacal complex thereof.

12. The method of claim 1, wherein the cross-linking agent is mixed with the aqueous solution or dispersion of carboxylated hydrophilic acrylic copolymer and the animal- or bird-repellant and ultraviolet-absorbing agent immediately before application to the locus being protected.

13. The method of claim 1, wherein the amount of ultraviolet-absorbing agent is from about 0.0005% to about 0.30% by weight of the aqueous solution or dispersion and wherein the ultraviolet-absorbing agent absorbs from about 2700 Å to about 3300 Å.

14. The method of claim 1, wherein the animal- or bird-repelling composition also contains a herbicide, fungicide, insecticide, nematocide, plant growth regulator, fertilizer or colorant.

15. The method of claim 1, wherein the carboxylated hydrophilic acrylic copolymer contains monomer units from about 56% by weight of methyl methacrylate, about 30% by weight of ethyl methacrylate and about 14% by weight of acrylic acid, wherein the cross-linking agent is a diglycidyl or triglycidyl ether and wherein the ultraviolet-absorbing agent is 2-ethoxyethyl p-methoxycinnamate.

16. The method of claim 1, wherein the amount of animal- or bird-repellant is 0.5–5% by weight of the dispersion.

17. The method of claim 1, wherein the animal repellant is tetramethythiuram disulfide.

18. The method of claim 1, wherein the animal repellant is bone tar oil.

19. The method of claim 1, wherein the dispersion also contains maleic hydrazide.

20. The method of claim 1, wherein the carboxylated hydrophilic acrylic copolymer contains monomer units from about 44% by weight of butyl acrylate, 40% by weight of methyl acrylate and about 16% by weight of acrylic acid.

21. The method of claim 20, wherein the cross-linking agent is zinc ammonium carbonate and the ultraviolet-absorbing agent is 2-ethoxyethyl p-methoxycinnamate.

22. The method of claim 1, wherein the carboxylated hydrophilic acrylic copolymer contains monomer units from about 90% by weight of ethyl acrylate and about 10% by weight of acrylic acid.

23. The method of claim 22, wherein the cross-linking agent is glycerine-triglycidyl ether and the ultraviolet-absorbing agent is 2-ethoxyethyl p-methoxycinnamate.

* * * * *